United States Patent Office 3,542,818
Patented Nov. 24, 1970

3,542,818
PROCESS FOR THE PREPARATION OF
α-HYDROXY ALDEHYDES
Verlan H. Van Rheenen, Kalamazoo, Mich., assignor to
The Upjohn Company, Kalamazoo, Mich., a corporation of Delaware
No Drawing. Filed Aug. 5, 1969, Ser. No. 847,725
Int. Cl. C07c 169/40
U.S. Cl. 260—397.4    6 Claims

ABSTRACT OF THE DISCLOSURE

Novel hydroxy aldehydes (II) are prepared by the copper catalyzed oxygenation of a compound having the structure of Formula I. The hydroxy aldehydes are useful as intermediates for the preparation of steroid 17-ketones. The reaction:

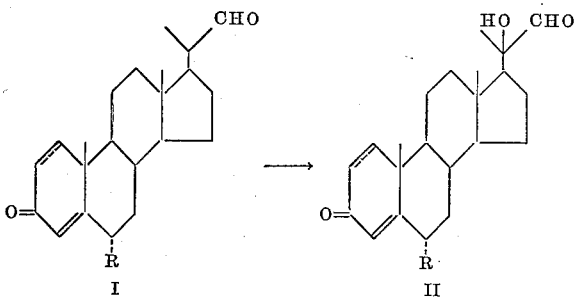

can be carried out alternatively by (A) using the copper salt in the presence of a free tertiary amine and a reducing agent, or (B) using a cuprous salt in the presence of a primary amine salt, preferably a salt of the same acid as cuprous salt. In each instance (A or B) III:

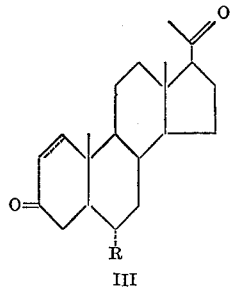

is formed in relatively lesser amounts compared with II.

BRIEF SUMMARY OF THE INVENTION

In the above formulas, the broken line in the A-ring indicates the optional presence of a 1-dehydro double bond, and the value of R can be hydrogen, lower alkyl or halogen. The alternative reactions can be carried out in a polar aprotic solvent such as dimethylformamide, dimethylsulfoxide, hexamethylphosphoramide, and the like. Such solvents are preferred because they will dissolve the aldehyde I and the inorganic solvent used as catalyst. Of the various aprotic solvents that can be used those having high boiling points are preferred because they involve less hazard in the presence of gaseous oxygen.

In reaction A, the catalyst can be (a) cuprous or (b) cupric salts of any nonoxidizing inorganic or organic acid. Examples are cupric acetate, cupric chloride, cupric sulfate, cupric iodide or cupric bromide. The corresponding cuprous salts can also be used in the reaction, being oxidized readily to the cupric form with the oxygen of the reaction. The copper salts can be used in the form of a complex with complexing agents such as phenanthroline or 2'-bipyridyl. In reaction B, the cuprous salts are used.

The reaction (A or B) is carried out in the presence of an amine. In A, a tertiary amine of the usual type of the trialkyl amines can be used. Less hindered tertiary amine bases such as diazobicyclooctane (DABCO) perform very well. In reaction B, a primary amine salt is used together with a cuprous salt, both agents having the same anion. Examples are methylamine hydrochloride used with cuprous chloride, aniline hydrochloride used with cuprous chloride and, ethylamine sulfate used with cuprous sulfate.

The reaction (A or B) can be run at a temperature which can vary over a wide range between the freezing point of the reaction mixture and its reflux temperature. We prefer temperatures in the range of 25° C. to 65° C. for the sake of convenience, and the range 45°–55° C. has been found generally to be effective in most instances.

The compounds of Formula III include progesterone and are useful for such purposes as progesterone is useful, i.e., in the maintenance of pregnancy of mammals.

The compound of Formula II can be converted to the corresponding 3,17-dione (e.g., androsten-3,17-dione) by treatment of II with mesyl chloride and/or sulfur dioxide to produce intermediate compounds:

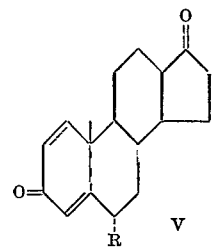

Compound IV can be reacted with ozone to produce the corresponding 3,17-dione:

Compounds of Formula V can in turn be used as intermediates in the manufacture of the corresponding estrone compounds which can be used for the same purposes as estradiol, e.g., the chronologic regulation of estrus in ewes.

Reaction according to A is carried out in the presence of a strong reducing agent such as an organic phosphine or an organic phosphite. The reaction proceeds to the α-hydroxy aldehyde II in yields that vary up to 50% or more. Examples of the reducing agents are: ethylphosphine, phenylphosphine, dimethylphosphine, diethylphosphine, diphenylphosphine, trimethylphosphine, triethylphosphine, triphenylphosphine, trimethylphosphite, triethylphosphite, and triisopropylphosphite.

The reaction products in either A or B can be separated into the two major products, II and III, by methods that will readily occur to the skilled chemist such as chromatography, fractional crystallization, countercurrent separation and the like. The following specific examples illustrate the invention.

DETAILED DESCRIPTION OF THE INVENTION

A procedure for the insertion of the 6α-lower-alkyl group is found in U.S. Pat. 2,968,655 and methods of introducing the 6α-fluoro substituent is found in U.S. Pat. 2,841,600, while methods for introducing the 1-dehydro double bond will be found in U.S. Pat. 2,902,410 and U.S. Pat. 3,423,434.

Example 1.—Preparation of 3-keto-20-hydroxybisnor-4-cholen-22-al

To a mixture of 25 g. 3-ketobisnor-4-cholen-22-al and 10 g. of diazobicyclooctane in 65 ml. of dimethylformamide is added a copper complex made up of 0.5 g. of cupric acetate and 0.45 g. of 2,2′-bipyridyl in 10 ml. of dimethylformamide. After 15 ml. (1.5 mole equivalent) of trimethylphosphite is added the reaction mixture is brought to a temperature of 45° C., and oxygen is bubbled through it for a period of 20 hours.

Workup is effected by high vacuum distillation of the solvent, dissolving the residual mixture in methylene chloride and extracting with 1 N hydrochloric acid followed by buffer and water. The methylene chloride solution is dried and the solvent removed by evaporation, leaving a light yellow semi-solid product which is chromatographed over silica gel using 10% acetone/Skellysolve B hexanes as the eluting solvent. Yield 7.81 g. (32%) 3-keto-20-hydroxybisnor-4-cholen-22 al, M.P. 187–197° C.

Analysis.—Calcd. for $C_{22}H_{32}O_3$: C, 76.70; H, 9.36. Found: C, 76.28; H, 9.46. $[\alpha]_D$ $CHCl_3 = +79°$, 5.9 g. progesterone (26.5%), M.P.=127°, $[\alpha]_D=176°$.

Example 2.—Preparation of 3-keto-20-hydroxybisnor-4-cholenaldehyde

Through a mixture of 12.5 g. of 3-ketobisnor-4-cholenaldehyde, 3.5 g. methylamine hydrochloride and 0.5 g. of cuprous chloride dissolved in dimethylformamide, oxygen is bubbled for 48 hours while the reaction is maintained at room temperature. The reaction mixture is poured into ice water and the precipitate is separated and filtered, taken up in solution and chromatographed over silica gel. Elution yields a major quantity of 3-keto-20-hydroxybisnor-4-cholen-22-al and a minor quantity of progesterone.

Example 3.—Preparation of 20-hydroxy-3-ketobisnor-1,4-choladiene-22-al

To 5 g. of 3-ketobisnor-1,4-choladiene-22-al (prepared from the starting material of Example 1, by protecting the 22-aldehyde group as the ketal and dehydrogenation using selenium dioxide or dichlorodicyanobenzoquinone) and 2 g. of DABCO in 30 ml. of dimethylformamide there is added 0.1 gram of cupric acetate, 0.1 g. of 2,2′-bipyridyl, and 3 ml. of trimethylphosphite. Oxygen is bubbled through the mixture for 20 hours while maintaining the reaction temperature at about 45° C. At the end of the reaction time, water is added to the mixture and the resulting precipitate is purified by chromatography on silica gel. The major product is 20-hydroxy-3-ketobisnor-1,4-choladiene-22-al, and 1-dehydroprogesterone is recovered as a minor product.

Example 4.—Preparation of 20-hydroxy-6α-methyl-3-ketobisnor-4-cholene-22-al 5 g. of 6α-methyl-3-ketobisnor-4-cholene-22-al (prepared by the addition of 6-methyl substituent in known manner to 3-ketobisnor-4-cholene-22-al) is substituted in the process of Example 3. The principal product, 20-hydroxy-6α-methyl-3-ketobisnor-4-cholene 22-al, and a minor amount of 6-methylprogesterone are separated by chromatography on silica gel.

Subjecting the 20-hydroxy-6α-methyl-3-ketobisnor-4-cholene-22-al to the action of selenium dioxide, produces 20-hydroxy-6α-methyl-3-ketobisnor-1,4-choladiene-22-al.

Example 5.—Preparation of 20-hydroxy-6α-fluoro-3-ketobisnor-4-cholene-22-al 5 g. of 6α-fluoro-3-ketobisnor-4-cholene-22-al (prepared by the addition of 6-fluoro substituent in known manner to 3-ketobisnor-4-cholene-22-al) is substituted in the process of Example 3. The principal product, 20-hydroxy-6α-fluoro-3-ketobisnor-4-cholene-22-al, and a minor amount of 6α-fluoroprogesterone are separated by chromatography on silica gel.

Subjecting the 20-hydroxy-6α-fluoro-3-ketobisnor-4-cholene-22-al to the action of selenium dioxide, produces 20-hydroxy-6α-fluoro - 3 - ketobisnor - 1,4 - choladiene-22-al.

I claim:
1. The process of producing the compound having the formula:

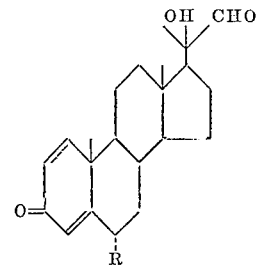

wherein the broken line in the A-ring represents the optional presence of the 1,2-double bond, and R is hydrogen, lower alkyl or halogen, which comprises oxidizing a compound of the following formula:

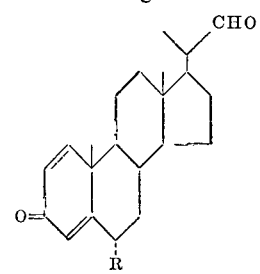

in the presence of a copper catalyst and an amine compound.

2. The process of claim 1, wherein the amine compound is a primary amine salt and the copper catalyst is a cuprous salt having the same anion as the amine salt.

3. The process of claim 1, wherein the amine is a tertiary amine and the reaction is carried out in the presence of an organic phosphine or an organic phosphite.

4. The novel chemical compound having the following structure:

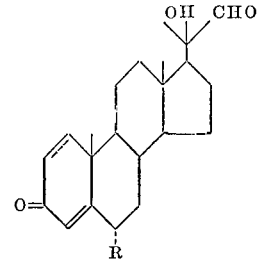

wherein the broken line in the A-ring represents the optional presence of 1-dehydro double bond and R is hydrogen, lower alkyl or halogen.

5. The compound 3-ketobisnor-20-hydroxy-4-cholenaldehyde.

6. The compound 20-hydroxy-3-ketobisnor-1,4-choladiene-22-al.

References Cited

UNITED STATES PATENTS

| | | | |
|---|---|---|---|
| 2,389,325 | 11/1945 | Reichstein | 260—397.4 |
| 3,478,065 | 11/1969 | Furst et al. | 260—397.2 |
| 3,481,926 | 12/1969 | Huppi | 260—239.55 |

LEWIS GOTTS, Primary Examiner

E. G. LOVE, Assistant Examiner

U.S. Cl. X.R.

260—397.3

UNITED STATES PATENT OFFICE
CERTIFICATE OF CORRECTION

Patent No. 3,542,818    Dated November 24, 1970

Inventor(s) Verlan H. Van Rheenen

It is certified that error appears in the above-identified patent and that said Letters Patent are hereby corrected as shown below:

Column 1, line 45, for " 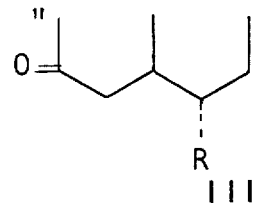 " read -- 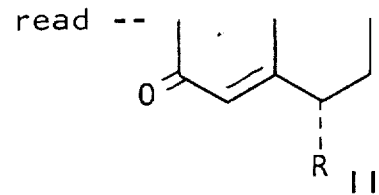 --

Signed and sealed this 18th day of May 1971.

(SEAL)
Attest:

EDWARD M. FLETCHER, JR.
Attesting Officer

WILLIAM E. SCHUYLER,
Commissioner of Pate